US011632592B2

(12) United States Patent
Srinivasan

(10) Patent No.: US 11,632,592 B2
(45) Date of Patent: Apr. 18, 2023

(54) INTEGRATING AUTHENTICATED PAY TELEVISION STREAMS INTO MOBILE IN-GAME SPORTS GAMING APPLICATIONS

(71) Applicant: SCORETRADE INC., Greenbrae, CA (US)

(72) Inventor: Bhuvanesh Srinivasan, Greenbrae, CA (US)

(73) Assignee: SCORETRADE INC., Greenbrae, CA (US)

( * ) Notice: Subject to any disclaimer, the term of this patent is extended or adjusted under 35 U.S.C. 154(b) by 0 days.

(21) Appl. No.: 17/063,718

(22) Filed: Oct. 5, 2020

(65) Prior Publication Data
US 2021/0136456 A1    May 6, 2021

Related U.S. Application Data

(60) Provisional application No. 62/928,955, filed on Oct. 31, 2019.

(51) Int. Cl.
*H04N 21/472* (2011.01)
*H04N 21/258* (2011.01)
*H04N 21/2187* (2011.01)
*H04N 21/478* (2011.01)
*H04N 21/44* (2011.01)
*H04N 21/475* (2011.01)
*G06Q 30/018* (2023.01)
(Continued)

(52) U.S. Cl.
CPC ..... *H04N 21/47211* (2013.01); *G06F 16/219* (2019.01); *G06Q 20/085* (2013.01); *G06Q 20/1235* (2013.01); *G06Q 30/0185* (2013.01); *G06Q 50/34* (2013.01); *G07F 17/3241* (2013.01); *G07F 17/3288* (2013.01); *H04L 63/083* (2013.01); *H04N 21/2187* (2013.01); *H04N 21/25875* (2013.01); *H04N 21/44* (2013.01); *H04N 21/4532* (2013.01); *H04N 21/4753* (2013.01); *H04N 21/4781* (2013.01); *G06Q 20/127* (2013.01); *G06Q 40/04* (2013.01)

(58) Field of Classification Search
None
See application file for complete search history.

(56) References Cited

U.S. PATENT DOCUMENTS

| 2015/0262456 A1* | 9/2015 | Shore | G07F 17/3288 463/25 |
| 2018/0190077 A1* | 7/2018 | Hall | G07F 17/3288 |
| 2019/0122500 A1* | 4/2019 | Joao | G07F 17/3288 |

* cited by examiner

*Primary Examiner* — Omar S Parra
(74) *Attorney, Agent, or Firm* — Lewis Roca Rothgerber Christie LLP

(57) ABSTRACT

In a system for integrating authentication of pay television streams for a sports gaming event using a graphical interface of a computing device application, the system including: a processor configured to: receive authentication information from a user; verify the authentication information with a media service provider; display a live video stream on the graphical interface in response to the verification of the authentication information; receive sports data about the sporting event via a network; access a database of historical statistics relating to the sporting event and to players playing in the sporting event; select at least one betting scenario from a betting scenario database based on the sports data and the historical statistics; display the at least one betting scenario on the graphical interface; and receive a response to the at least one betting scenario from the user.

23 Claims, 9 Drawing Sheets

(51) Int. Cl.
*G06Q 50/34* (2012.01)
*G06Q 20/12* (2012.01)
*G06Q 20/08* (2012.01)
*H04L 9/40* (2022.01)
*G06F 16/21* (2019.01)
*G07F 17/32* (2006.01)
*H04N 21/45* (2011.01)
*G06Q 40/04* (2012.01)

INTEGRATING AUTHENTICATED PAY TELEVISION STREAMS INTO MOBILE IN-GAME SPORTS GAMING APPLICATIONS

CROSS-REFERENCE TO RELATED APPLICATION(S)

This application claims priority to and the benefit of U.S. Provisional Patent Application No. 62/928,955 filed Oct. 31, 2019 and entitled "A SYSTEM OF INTEGRATING AUTHENTICATED PAY TELEVISION STREAMS INTO MOBILE IN-GAME SPORTS GAMING APPLICATIONS", the entire content of which is incorporated herein by reference.

FIELD

One or more aspects of embodiments according to the present disclosure relate to systems and methods for integrating authenticated pay television streams in the context of internet-based sports gaming device application.

BACKGROUND

Online gaming has increased in popularity, especially after the Supreme Court of the United States ruling that individual states could legalize sports gambling within their states. Online gaming players (e.g., users) can engage in online sports gaming through an application operating on a computing device. The application may include, but is not limited to, social media platforms, media streaming platforms, mobile device applications. The computing devices may include, but are not limited to, personal computers, mobile smart phones, or tablets. Using the various mediums, players can place bets on the final outcome of sporting events. In addition, bets or selections can be made in the context of fantasy sports, where the user is attempting to select a roster or portfolio of players, and also free-to-play contests, prediction contests, sweepstakes, and other sports wagering contests. Players can submit bets using real money or with fake money generated within the computing device application.

In addition, the sports ecosystem in America for the large part relies on subscribers paying monthly for cable television, satellite television, and over-the-top subscriptions to the traditional cable bundle of basic channels (e.g., Pay TV). The Pay TV provider of the cable bundle charges the subscriber a monthly fee, from which the provider pays the individual channels that it carries. For instance, Comcast may pay ESPN $6 per month for every subscriber that subscribes to Comcast's cable television bundle. ESPN, with the strength of these revenues and to maintain pricing power in continuing to receive these revenues from Pay TV providers, buys the rights to show live sporting events on ESPN. For instance, ESPN pays well over $1 billion to the NFL for the annual rights to telecast Monday Night Football on ESPN.

The sports gaming industry can capitalize on the proliferation of Pay TV subscription services that offer live sporting event feeds by integrating the feeds into online sports gaming platforms, including device applications used for sports gaming. This can improve the player gaming experience by allowing players to place wagers in real time while viewing the live broadcast feed of the sporting event within the gaming platform.

The above information disclosed in this Background section is only for enhancement of understanding of the background of the present disclosure, and therefore, it may contain information that does not form prior art.

SUMMARY

Aspects of embodiments of the present disclosure are directed toward systems and methods for integrating authenticated pay television streams into in-game sports gaming applications.

According to some example embodiments of the present disclosure, in a system for integrating authentication of pay television streams for a sports gaming event using a graphical interface of a computing device application, the system including: a processor; and a memory coupled to the processor, wherein the memory stores instructions that, when executed by the processor, cause the processor to: receive a request to display a live video stream of a sporting event from a user; receive authentication information from the user; verify the authentication information with a media service provider; display the live video stream on the graphical interface of the computing device application in response to the verification of the authentication information; receive sports data about the sporting event via a network; access a database of historical statistics relating to the sporting event and to players playing in the sporting event; select at least one betting scenario from a betting scenario database based on the sports data and the historical statistics; display the at least one betting scenario on the graphical interface; and receive a response to the at least one betting scenario from the user.

According to some example embodiments, the sports data is received from a third party vendor via the network.

According to some example embodiments, the authentication information includes a username and a password of the user.

According to some example embodiments, the media service provider includes at least one of: a Pay TV provider, a TV network, a professional sports league, a professional sports team, or a rightsholder.

According to some example embodiments, the instructions further cause the processor to receive the live video stream of the sporting event from the media service provider.

According to some example embodiments, the instructions further cause the processor to: invite an additional user to view the live video stream; receive additional authentication information from the additional user; verify the additional authentication information with the media service provider; and display the live video stream on an additional interface of an additional computing device application of the additional user in response to the verification of the additional authentication information.

According to some example embodiments, the instructions further cause the processor to display a second video stream of a second sporting event on the graphical interface of the computing device application, wherein the second video stream is selected from a plurality of video streams of a plurality of sporting events.

According to some example embodiments, the second video stream is selected by the user.

According to some example embodiments, the instructions further cause the processor to: receive sports data about the plurality of sporting events; select the second video stream of the second sporting event based on sports data about the second sporting event; and display the second video stream on the graphical interface of the computing device application.

According to some example embodiments of the present disclosure, in a system for integrating authentication of pay television streams for a sports gaming event using a graphical interface of a computing device application, the system including: a processor; and a memory coupled to the processor, wherein the memory stores instructions that, when executed by the processor, cause the processor to: request authentication to display a live video stream of a sporting event from a media service provider; receive authentication from the media service provider to display the live video stream of the sporting event based on a fee structure with the media service provider; display the live video stream of the sporting event on the graphical interface of the computing device application in response to the authentication from the media service provider; receive sports data about the sporting event via a network; access a database of historical statistics relating to the sporting event and to players playing in the sporting event; select at least one betting scenario from a betting scenario database based on the sports data and the historical statistics; display the at least one betting scenario on the graphical interface; and receive a response to the at least one betting scenario from a user.

According to some example embodiments, the instructions further cause the processor to send a payment to the media service provider according to the fee structure.

According to some example embodiments, the fee structure includes an amount of currency over a period of time.

According to some example embodiments, the fee structure includes a percentage of an amount of currency wagered by the user.

According to some example embodiments, the fee structure includes a percentage of an entry fee paid by the user.

According to some example embodiments, the sports data is received from a third party vendor via the network.

According to some example embodiments, the media service provider includes at least one of: a Pay TV provider, a TV network, a professional sports league, a professional sports team, or a rightsholder.

According to some example embodiments, the instructions further cause the processor to display a second video stream of a second sporting event on the graphical interface of the computing device application, wherein the second video stream is selected from a plurality of video streams of a plurality of sporting events.

According to some example embodiments, the second video stream is selected by the user.

According to some example embodiments, the instructions further cause the processor to: receive sports data about the plurality of sporting events; select the second video stream of the second sporting event based on sports data about the second sporting event; and display the second video stream on the graphical interface of the computing device application.

According to some example embodiments of the present disclosure, in a method for integrating authentication of pay television streams for a sports gaming event using a graphical interface of a computing device application, the method including: requesting, by a processor, authentication to display a live video stream of a sporting event from a media service provider; receiving, by the processor, authentication from the media service provider to display the live video stream of the sporting event based on a fee structure with the media service provider; displaying, by the processor, the live video stream of the sporting event on the graphical interface of the computing device application; receiving, by the processor, sports data about the sporting event via a network; accessing, by the processor, a database of historical statistics relating to the sporting event and to players playing in the sporting event; selecting, by the processor, at least one betting scenario from a betting scenario database based on the sports data and the historical statistics; displaying, by the processor, the betting scenario on the graphical interface; and receiving, by the processor, a response to the betting scenario from a user.

According to some example embodiments, the method further includes: sending, by the processor, a payment to the media service provider according to the fee structure.

According to some example embodiments, the fee structure includes an amount of currency over a period of time.

According to some example embodiments, the fee structure includes a percentage of an amount of currency wagered by the user.

According to some example embodiments, the fee structure includes a percentage of an entry fee paid by the user.

DETAILED DESCRIPTION

Figure 1:
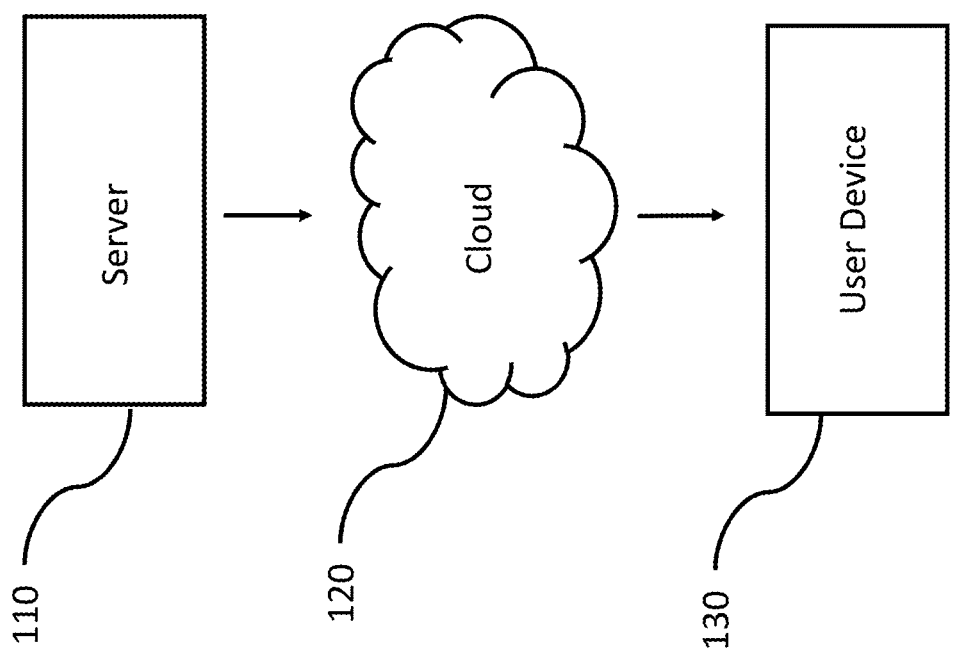
FIG. 1 illustrates a system block diagram of the operation of the sports gaming device application.

The exemplary embodiments of the present invention disclosed herein are directed to a system and method for integrating authenticated pay television streams into mobile in-game sports gaming applications. As used herein, a sports gaming event refers to an event wherein at least one user places at least one wager on at least one betting scenario (i.e., places a bet) displayed within an application and wherein the outcome of the wager is maintained by the application. As used herein, a sports gaming event can also refer to an event wherein at least one user sells a wager on at least one betting scenario to another user or to the "house" using an application. As used herein, a gaming entity can be a business involved in real money sports betting, real money fantasy contests, or free-to-play sports predictions or fantasy contests. As used herein, a rightsholder can be a Pay TV distributor, television (TV) network, a professional sports team, a professional sports league (e.g., NBA, NFL, MLB, etc.), or any entity with the appropriate rights to show streams of televised sports to either Pay TV subscribers or non-subscribers (i.e., a media service provider). It will be appreciated that the term "sports" may refer to traditional sports such as soccer, baseball, and basketball, "esports" such as video games, as well as card games, board games, and any other competition on which betting scenarios could be generated. It will be further appreciated that "sports gaming event" and "gaming event" may be used interchangeably herein.

In one example of a sports gaming event, a user of the sports gaming application decides to place a wager on a particular betting scenario (described in more detail below) and the application updates and maintains such user's point or cash total after the betting scenario has occurred or has not occurred. In another example, a tournament in which multiple users place wagers on numerous betting scenarios based on a specified set of events (e.g., a specified game or a specified group of games) or based on a particular time frame (e.g., a single day, a single sports tournament, or a single season), wherein the point totals of each player are maintained for the duration of the specified set of events or time frame, and a winner is declared at the end of the tournament is also an example of a sports gaming event. However, it will be appreciated that there are countless other sports gaming events which involve at least one user placing a wager on at least one betting scenario that could be generated by, run on, and/or maintained by the application according to embodiments of the present invention.

In general, the device application according to embodiments of the present invention allows for at least one live video feed to be displayed on an interface (e.g., a bet selection interface) wherein the application also allows users to place wagers via the interface as described in more detail below. As such, a user of the device application will be able to simultaneously view the live video feed and participate in a sports gaming event, if they choose to, by placing wagers on the likelihood of an occurrence of an event displayed on the screen or by placing wagers selectable from a menu of betting scenario options.

As used herein, a betting scenario refers to a particular outcome (e.g., a player will hit a homerun within the next three pitches) coupled with a price, i.e., a value that indicates the likelihood of such event occurring. For any betting scenario, a user will have the ability to place a wager on the event occurring and will obtain a reward in the form of real money, pretend money, points, or other scoring method, if the event occurs. The event can also include fantasy bets and selections.

As described in more detail below, the application allows for a user to place wagers on the probability that specific events that may occur within the duration of a live sporting event rather than merely the final outcome and that the application can dynamically adjust the price of any betting scenario depending on various factors including actual occurrences in the live sporting event as well as the number and size of wagers placed on that particular betting scenario by other users. Further still, the application allows a user to create and display their own live betting scenarios for other users to wager on.

According to various embodiments, the interface of the sports gaming device application can include a live video stream adjacent to or otherwise being a part of a bet selection interface. The live video stream may be a live broadcast feed of a sporting event. It will be appreciated that the broadcast feed of the sporting event may be streamed with consent of a rightsholder, league, team, or pay TV distributor via an authentication and/or compensation mechanism. The bet selection interface can display one or more proposed betting scenarios for the live sporting event. In some embodiments, betting scenarios corresponding to the live sporting event can be automatically generated by the gaming or by a user in real time, or by a gaming entity. Such generated betting scenarios can appear on the bet selection interface.

In some embodiments, the host can invite other users of the device application (e.g., guests) to view the live video of the sporting event through the device application. According to various embodiments, the sports gaming event can include a co stream (e.g., a community stream) among the host and the guests. The players on the community stream can communicate with each other about the live sporting event while simultaneously viewing it together on their respective devices. In some embodiments, the host can generate betting scenarios based on the communication with the guests and the live sporting event feed. In other embodiments, betting scenarios corresponding to the live sporting event can be automatically generated in real time. The betting scenarios generated by the host and the automatically generated bets can be displayed on the bet selection interfaces of each guest's respective device.

According to various embodiments, users can authenticate a Pay TV subscription in the device application in order to view the live feed of a sporting event. In some embodiments, the user can authenticate his subscription using a username and password (e.g., authentication information) provided by the Pay TV subscription provider. In some embodiments, each player in a community stream can similarly authenticate their television subscription in the device application. In some embodiments, different users in a community stream can be aggregated together based on the timing of their respective broadcast feeds of the live sporting event.

According to various embodiments, gaming entities can offer free or discounted streams of the live sporting event or recoup some of the costs of the Pay TV subscription through the device application (e.g., Verified Authenticated Stream Subsidization Engine for Gamers (VASSEG)). To this end, the gaming entities can track the user's gaming activity, including gaming tournament entry fees paid by the user, wagers placed by the user, and amount of real money deposits made by the user.

According to various embodiments, users who do not have a Pay TV subscription (e.g., unauthenticated users) can still view a live feed of the sporting event within the sports gaming device application. The rightsholder, league, team, or pay TV distributor can receive compensation for offering feeds of live sporting events to unauthenticated users through various fee structures (e.g., Verified Authenticated Stream Compensation Engine for Rightsholders (VASCER)). In some embodiments, rightsholders, league, team, or pay TV distributor can be compensated on a fee structure such as dollars per second or dollars per minute, or only allow viewing for a set time period (e.g., one hour) or based on the amount of money deposited. In other embodiments, rightsholders, league, team, or pay TV distributor can be compensated a percentage of the dollar amount wagered by the unauthenticated user or a percentage of the entry fee paid by the unauthenticated user.

According to various embodiments, a user may have a Pay TV subscription that authorizes the user to view various broadcasts of different sporting events in the sports gaming device application. In some embodiments, the user can manually switch between the feeds of the different sporting events. In other embodiments, the feeds can be switched automatically between the different sporting events based on the volatility of the sporting event, such as how close the score is, how much time is remaining in the game, whether the game is in overtime, and the like. (e.g., Verified Authenticated Streaming and Switching Engine Technology (VASSET)).

FIG. 1 illustrates a system block diagram for the operation of integrating authenticated pay television steams into in-game sports gaming applications according to an embodiment of the present disclosure.

Referring to FIG. 1, the server 110 can transmit data to and receive data from a computer network 120 such as the Internet. Further, the computer network 120 can transmit data to and data from a user device 130. The user device 130 may have an interface that can display a betting scenario, a price of the betting scenario, and a live video stream display. Further, the user can use the user device 130 to place a wager on the betting scenario or trade a wager to another use via the interface. Further still, the user can receive a live broadcast feed of a live sporting event on the video stream display. Additionally, the user can authenticate a television or other media provider subscription (e.g., Pay TV subscription) within the application interface that authorizes the user to view the broadcast feed of live sporting event on the live video stream display.

In some embodiments, the server 110 can include a processor and memory storing instructions, where the processor executes the instructions to implement the gaming engine for managing the gaming event. While the terms "server," "processor" and "memory" are used herein in the singular, embodiments of the present disclosure are not limited thereto, and may be implemented by multiple computer systems and/or computer servers, each of which may have one or more processors and one or more memories (e.g., different types of memory such as persistent memory and volatile memory). Therefore, unless otherwise explicitly described otherwise, operations that are described herein as being performed or implemented on a server and/or by a processor and memory may be construed as including being implemented on multiple servers and/or by multiple processors and memories, where the multiple servers may perform substantially the same tasks (e.g., operating in parallel), may perform substantially different tasks (e.g., perform different aspects of embodiments of the present disclosure), or combinations thereof.

Figure 2:
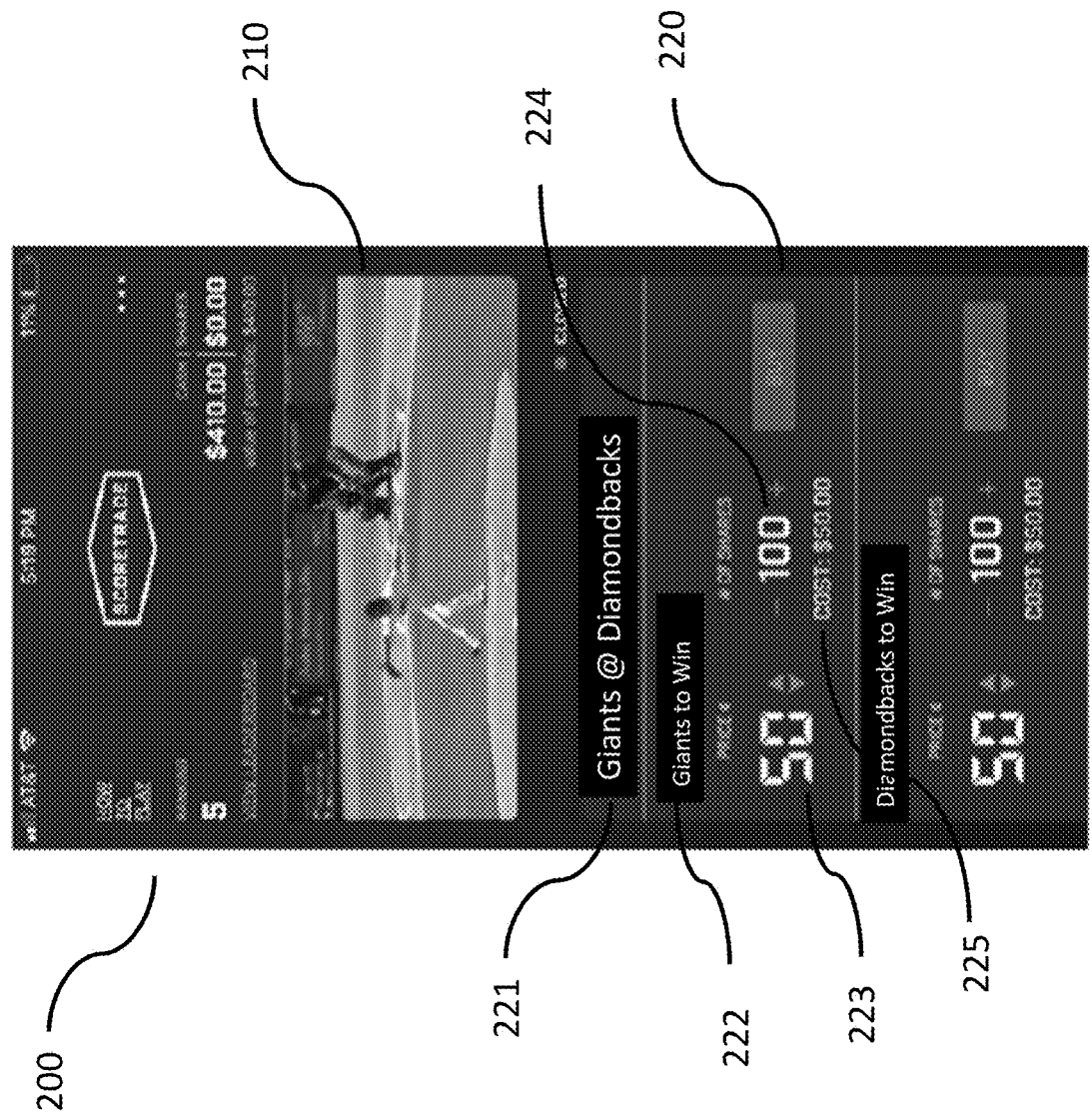
FIG. 2 illustrates an interface of the device application displaying a live sporting event feed according to an embodiment of the present disclosure.

FIG. 2 illustrates an interface of the device application displaying a live sporting event broadcast feed according to an embodiment of the present disclosure.

According to FIG. 2, a live sporting event feed can be displayed on a video stream 210 within an application interface 200. In some embodiments, the video stream 210 may be integrated into the device application using a video application programing interface (API). In various embodiments, the application interface 200 can be run on a computing device. The computing device may include a personal computer, a mobile phone, or a tablet, but is not limited thereto. In some embodiments, the application can be operated and designed by a gaming entity (e.g., an entity business involved in real money sports betting, real money fantasy contests, or free-to-play sports predictions or fantasy contests). In other embodiments, the application may be operated and designed by a Pay TV provider (e.g., cable company, satellite company, Google's YouTube, Netflix, Amazon Prime, and other over-the-top providers). According to various embodiments, gaming entities may include sports betting, fantasy sports entities, and other types of gaming entities.

Referring to FIG. 2, the video stream 210 may be adjacent to or as otherwise a part of a bet selection interface 220. The bet selection interface 220 may display betting scenarios selected by a host user (e.g., a host) or a gaming entity, or may display betting scenarios generated automatically by a gaming engine. In some embodiments, the bet selection interface 220 may display bets based on the live sporting event shown on the video stream 210. A user can place a wager on the betting scenario at the displayed price using the bet selection interface 220. Additionally, the user can sell a wager to other users via the bet selection interface 220. It can be appreciated that while the bet selection interface 220 is one method for placing a wager on a generated bet and various other embodiments, other methods and interfaces can be used for placing a wager or selling a wager.

Additionally, the bet selection interface 220 may include information about the betting scenario including the title of a sporting event 221, a betting scenario description 222, and the price 223. For example, the price 223 may be a value of a single bet share, wherein the bet selection interface 220 may also include the ability for a user to choose the total number of bet shares 224 that they would like to wager and which is also displayed by the bet selection interface. Additionally, the bet selection interface 220 can include the ability for the user to sell a wager to another user at the price 223. Further still, the bet selection interface can display the total cost 225 of the betting scenario, the number of shares 226 of the betting scenario owned by the user, and buttons that allow a user to take certain actions, such as the ability to "Buy" or "Sell" a certain number of shares. It will be appreciated that the bet selection interface 223 could also display other information associated with the betting scenario including, for example, the duration of a time limit placed on the betting scenario, the number of shares of that betting scenario held by other users, and the total value of the amount that a user has available to wager on betting scenarios.

According to various embodiments, the betting scenarios can be automatically generated or selected by a gaming engine. In some embodiments, the gaming engine can generate or select betting scenarios based on using sports data received, such as from third party providers, over a network (e.g., internet). The sports data can include, for example, statistical information about the most recent play, a player's current stats, a player currently in the game, a recent injury, a launch angle of a ball, the distance traveled by a ball, or other information about the live sporting event. In some embodiments, the gaming engine can automatically generate or select betting scenarios using sports data from the live sporting event currently displayed on the video stream 210. It will be appreciated that the amount of data about particular sporting events that is tracked by available technology is significant and that the gaming engine can use any of this data by itself or in combination to generate and price betting scenarios.

The information displayed on the bet selection interface 220 can be updated in real time by the gaming engine due to the gaming engine processing certain information relating to a particular betting scenario and/or a particular sporting event. The gaming engine may track and cause to be displayed on the bet selection interface wagers placed by the players in the device application. In some embodiments, the gaming engine may update the price 223 in response to recent events in a live sporting event or in response to bettors placing bets within the device application. For example, the number of bets submitted for a particular bet or a team winning by a certain number of points may lead the gaming engine to adjust the price 223.

As mentioned previously, the video stream 210 may display a live video broadcast feed from a sporting event. In some embodiments, the gaming engine may automatically generate bets based on the sporting event currently displayed on the video stream 210. In other embodiments, the host or gaming entity may select betting scenarios based on the sporting event currently displayed on the video stream 210. The generated bets can be displayed on the bet selection interface 220. For example, the video stream 210 may show a live baseball game and the bet selection interface 220 can display a proposed betting scenario on whether the pitcher will strike out the next batter.

In some embodiments, a host user (e.g., host) watching a live sporting event on the video stream 210 can invite other users (e.g., guests) to view the same live sporting event on their respective devices (e.g., a community stream). In a community stream, the host and guests can communicate with each other about the live sporting event on the video stream 210. The host can generate bets based on the conversation with the guests and based on the live sporting event. In some embodiments, the gaming engine can use sentiment analysis of the community stream to assist in generating bets and adjust the pricing of the bets. The generated bet can be displayed on the bet selection interface 220 for each of the guests.

According to various embodiments, the user may be required to have a television provider subscription in order to view a live sporting event on the video stream 210, such as a cable television subscription or a satellite television subscription (e.g., Pay TV subscription). Many Pay TV subscription services provide a username and password to subscribers (e.g., authentication information). The device application can allow users to authenticate their subscriptions by allowing them to enter the username and passwords corresponding to their Pay TV subscription. The device application can verify the username and password information with the corresponding subscription provider. If verification is successful, the device application can retrieve the broadcast feed of the live sporting event and display it on the video stream 210 to the authenticated user.

Figure 3:
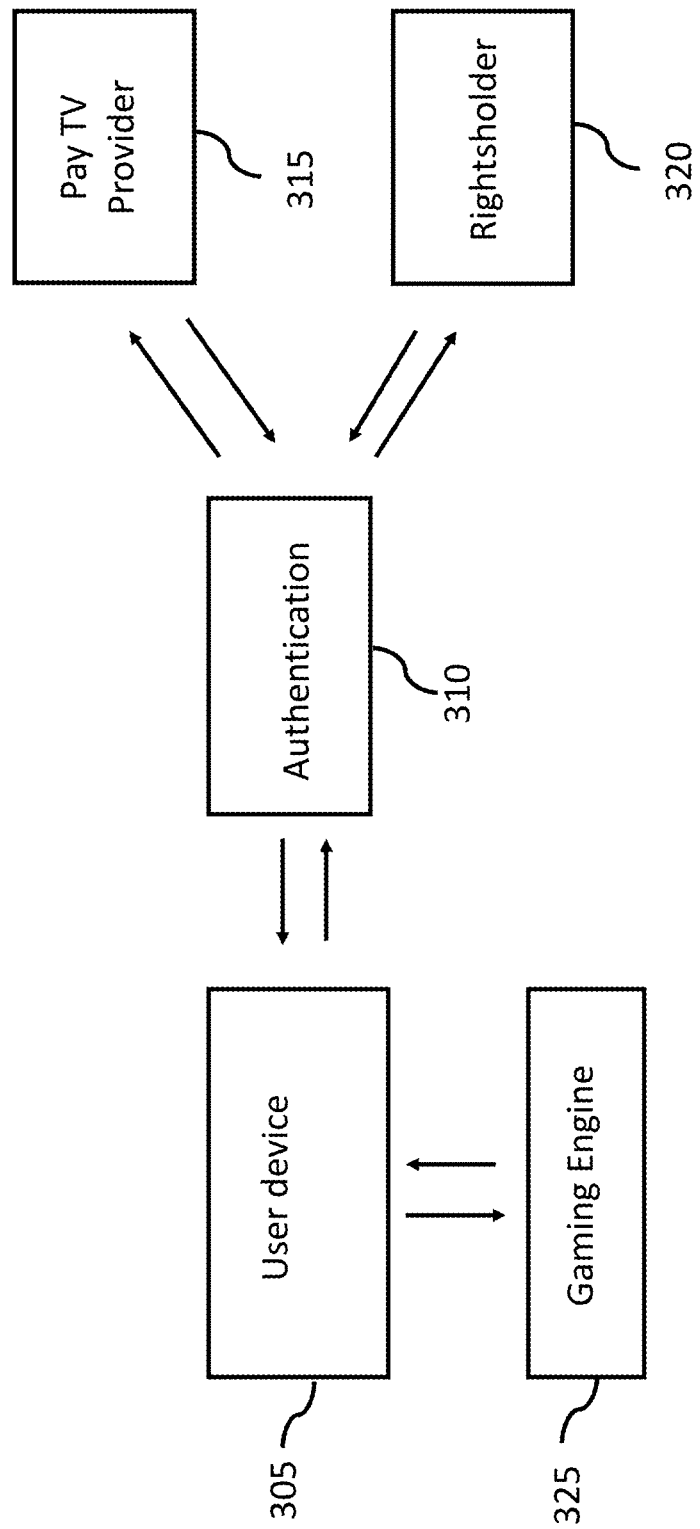
FIG. 3 shows a flowchart showing a method for authenticating a user using the device application according to an embodiment of the present disclosure.

FIG. 3 shows a flowchart showing a method for authenticating a user using the device application according to an embodiment of the present disclosure.

Referring to FIG. 3, the user can request to view a live video stream of a sporting event on his computing device 305. In response to the request, the user may be asked to authenticate his Pay TV subscription in 310. In some embodiments, the user can authenticate his Pay TV subscription by entering a username or password (e.g., authentication information) that was provided by the user's Pay TV subscription provider. The user's authentication information can be verified by sharing the information with the corresponding Pay TV provider 315 or the corresponding rightsholder 320. If the Pay TV provider 315 or the rightsholder 320 verify the user's authentication information, the Pay TV provider 315 or the rightsholder 320 can authorize the user to view the live broadcast feed of the sporting events. Additionally, the gaming engine 325 can generate betting scenarios based on the live broadcast feed of the sporting event currently displayed on the user's device 305.

During a community stream, each guest may also be required to have a Pay TV subscription in order to view the live sporting event on the video stream 210. The device application can allow the guests to authenticate their subscriptions by allowing them to enter their usernames and passwords corresponding to their Pay TV subscriptions. The device application can verify the username and password information with the corresponding subscription provider. In one embodiment, the system could check to see if the device user is an authenticated subscriber either on a monthly, trial, or pay-per-view or other basis before showing the live stream of the game.

In some embodiments, a Pay TV provider and/or a rightsholder can offer free or discounted subscriptions to users through the device application to allow users to view a live sporting feed on the video stream 210 (e.g., Verified Authenticated Stream Subsidization Engine for Gamers (VASSEG)). VASSEG can allow users to receive free or discounted subscriptions or recoup some of the costs of their paid subscriptions by tracking the users' gaming activity. Additionally, VASSEG can provide additional access to view other live sporting events on the video stream 210 based on a user's payment of entry fees for gaming tournaments, a user's payment of other multiple and ongoing entry fees, the users' wagering activity, and the value of real money deposited by the user. In one example, a user can receive a free viewing of an inning of baseball based on the user's betting scenario selections. This prize structure can allow the user to continue the free viewing if the user is successful in his betting scenarios. The user may wager that the batter will get an extra base hit, and can view three additional innings of the game if his bet is successful.

According to various embodiments, a user may not have a Pay TV subscription (e.g., an unauthenticated user), but may still be able to view a live broadcast feed of a sporting event in a sports gaming device application. In these embodiments, a device application can allow unauthenticated users to view a live sporting event feed, while providing various fee structures for the Pay TV providers and rightsholders to be compensated for the unauthenticated users' viewing of the sporting events (e.g, Verified Authenticated Stream Compensation Engine for Rightsholders (VASCER)).

The VASCER system exists between the sports gaming entities on one side, who wish to show live sporting events to unauthenticated users who are paying entry fees for a gaming tournament or engaging in other wagering activities, and Pay TV providers, TV networks, leagues, teams, and other rightsholders on the other side. Under this system, the Pay TV provider and rightsholder can be directly compensated based on the wagering activity of unauthenticated users that are viewing the stream. In some embodiments, the Pay TV and rightsholder can be compensated on a fee structure such as cents per second or dollars per minute, or only allow viewing for a set time period (e.g., one hour). For example, an unauthenticated user on the device application can be wagering on a certain set of games, based on the value of the wagers, the Pay TV provider or the rightsholder can enable the device application to allow the unauthenticated user to view one or more games. In exchange, the Pay TV provider or the rightsholder can be compensated by a percentage of the dollar amount wagered by the unauthenticated user or entry fee paid by the unauthenticated user. In some embodiments, the Pay TV provider and rightsholders can authorize a gaming entity to stream the live sporting event through the device application if the gaming entity agrees to certain compensation parameters requested by the Pay TV provider and rightsholders. According to various embodiments, the fee structure can be established by an agreement between the media service provider and the gaming entity or other operator of the sporting gaming device application. The fee structure may be specified in advance or negotiated algorithmically or accepted in other automated ways in real-time.

Figure 4:
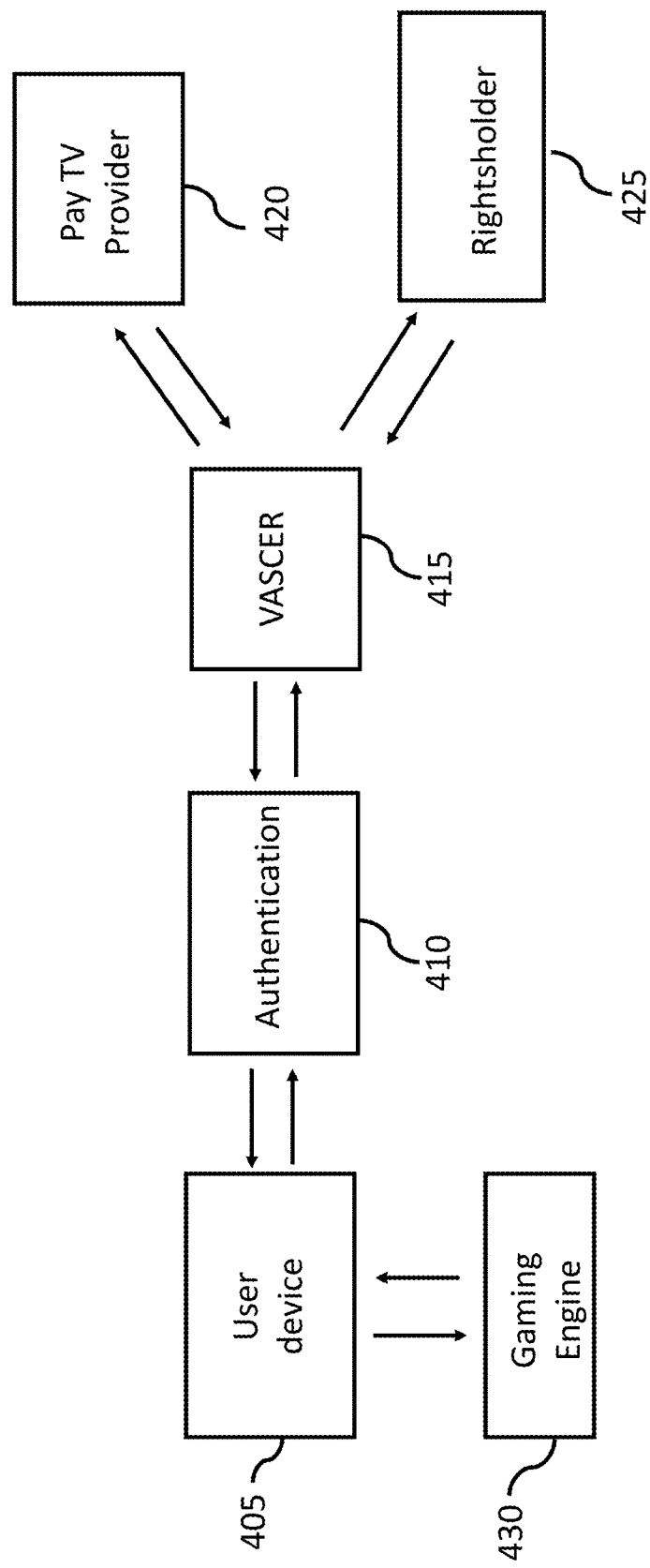
FIG. 4 is a flowchart showing a method for compensating a Pay TV provider or a rightsholder using VASCER according to an embodiment of the present disclosure.

FIG. 4 is a flowchart showing a method for compensating a Pay TV provider or a rightsholder using VASCER according to an embodiment of the present disclosure.

Referring to FIG. 4, the user can request to view a live video stream of a sporting event on his computing device 405. In response to the request, the user may be asked to authenticate his Pay TV subscription in 410. However, in some embodiments the user may not have a Pay TV subscription (e.g., unauthenticated user). In these embodiments, the unauthenticated user can still view the live broadcast feed of the sporting event using VASCER 415. Under VASCER 415, a compensation mechanism can be setup with the Pay TV provider 420 and the Rightsholder 425. The compensation mechanism can allow the unauthenticated user to watch the live broadcast feed of the sporting event. In some embodiments, the Pay TV Provider 420 and the Rightsholder 425 can be compensated on a fee structure such as dollars per second or dollars per minute, or only allow viewing for a set time period (e.g., one hour). In other embodiments, the Pay TV Provider 420 and the Rightsholder 425 can be compensated by a percentage of the dollar amount wagered by the unauthenticated user or entry fee paid by the unauthenticated user Additionally, the gaming engine 430 can generate betting scenarios based on the live broadcast feed of the sporting event currently displayed on the user's device.

In some embodiment, gaming entities can choose from a variety of allowable compensation schemes authorized by the Pay TV, TV network, league, team, or other distributor. Compensation schemes can include a percentage or fixed amount payable per depositing bettor or gamer, a percentage of each deposit, a percentage of the wagers made during the viewing of the authorized streams, a percentage of the entry fees for a fantasy contest, a fixed fee per second or minute or micro-time increment of showing the authorized stream during the gaming activity, or a fee based on the authorized stream successfully enticing the gamer to play or wager in another permutation of wagering or fantasy game offered by the gaming entity.

For example, a Regional Sports Network (RSN) with broadcast rights to the Seattle Mariners might specify that an authorized sports betting entity or fantasy game operator can show the stream of Mariners games to unauthenticated users provided that either a fee of 5 cents per inning is collected, or 5% of the entry fee for any tournament that the inning of the game is vital or is a supporting element, or 3% of the sports wagers involving the inning of broadcast. If the sports betting entity or fantasy operator wishes to allow the stream of the Mariners game to be embedded and shown to the unauthorized users, the sports betting entity or fantasy operator would allow for a tracking mechanism or other auditing mechanism, either real-time or ex post facto, to keep track of how much is owed to the RSN if it has the rights to participate in such a compensation mechanism.

According to this embodiment, Pay TV providers and rightsholders can offer real money wagering or real money fantasy games to users through the device application, where a certain number of bets made or real money fantasy games entered will qualify the user for a rebate, discount, or free subscription to the rightsholder or Pay TV provider. Further, users can purchase subscriptions to a Pay TV provider (e.g., YouTube TV) or a rightsholder (e.g., NFL Sunday Ticket) through the device application. Additionally, the Pay TV and rightsholders can offer a variety of promotions to enable users' subscriptions to be discounted or rebated based on the size of the users' real money deposits, friends invited to fantasy games, entry fees paid in a particular month towards the Pay TV or rightsholder's fantasy games.

In some embodiments, an individual channel or sports network (e.g., ESPN) as a Pay TV provider can operate fantasy games or a real money sports wagering operation whereby the Pay TV streams are provided at no cost to the user within the device application, with the expectation that the revenue from the user's gaming activity will allow the sports gaming revenues to offset the cost of free viewing.

In some embodiments, a discounted or subsidized free stream within the device application can show a stream that is intended to engage and stimulate gaming activity within the device application. For instance, a Pay TV live feed for a Major League Baseball game can appear as usual whereas the specified stream (e.g., a stream embedded or layered with sports data elements) can show betting scenarios on the bet selection interface 220. In some embodiments, these betting scenarios can be generated by the gaming engine, hosts, tournament leaders, and other activity tied to the device application or Pay TV provider fantasy games or real money wagers offered. The Pay TV stream synced and customized to the gaming activity on the device application will enable the Pay TV provider or the rightsholder or the gaming entity to recoup the subsidy of the stream by generating and stimulating increased gaming activity.

According to various embodiments, gaming entities, Pay TV providers, or rightsholders can offer contests where a segment of winners can earn the rights to view an entire live sporting event, view more minutes of the live sporting event, or view more live sporting events on a particular day. Others that did not win ongoing viewing may be enticed to play again to keep viewing. For example, the first quarter of the earlier time group of Sunday football games can be shown for free within the device application provided that the user plays in a short or long fantasy tournament or places a certain quantity of sports wagers that may or may not settle by the end of the first quarter—after the first quarter is finished, the user can be prompted to play in another short or long fantasy tournament or be asked to place an additional sports wager. This embodiment is similar to a casino granting a free hotel night and inducing more gaming action for subsequent free hotel nights.

In some embodiments, a sports bar or venue can receive subsidized or free access to a Pay TV or rightsholder subscription based on the number of venue patrons that are playing on a device application. In another embodiment, a bar or venue can receive a percentage of the revenue, deposits, or entry fees in exchange for agreeing to show certain live sporting events, for instance, a developing sport or league, or receive compensation for showing a live sporting event on the largest video screen at the venue.

In another embodiment, the entry fee for a gaming tournament may be free, but in order for the user to actually watch the live sporting event on the video stream 210 in FIG. 2 or to receive the game statistics inside the device application synced to the game, the user will need either an authenticated subscription or a payment mechanism for the live sports feed. The benefit of this embodiment is that the gaming tournament remains free to play, has a prize pool, but creates an incentive structure for the users to pay for the content that supports the gaming experience. The user can still play for free, but to enhance the experience with content requires additional fees. Pay TV providers and rightsholders can offer a free-to-play game, which has low regulatory threshold, but simply offer a paid subscription element enabling the user to pay to view the actual live sporting event or live sporting events.

In some embodiments, a host, who wishes to sponsor or underwrite a tournament for friends or the public, may elect to share a video stream of rights-restricted games. The host can charge the tournament participants an entry fee whereby a portion of the entry fees is allocated to the payments to the Pay TV providers or rightsholders for the ability to show a live feed of a sporting event for the tournament. Additionally, the device application can detect the latency of the authenticated stream of the various users, and look to place users in tournaments where the pace of the action is similar. Each authenticated stream can differ by seconds from one user to the other.

In some embodiments, the user may have a Pay TV subscription that grants user access to view different sporting events on the video stream 210 of FIG. 2. In some embodiments, the user can manually switch between the feeds of different sporting events on the video stream 210. In other embodiments, Verified Authenticated Streaming and Switching Engine Technology (VASSET) can automatically switch between the feeds of the different sporting events on the video stream 210. VASSET allows a user with access to multiple streams of sporting events to seamlessly watch different sporting events. The VASSET can automatically switch between the different sporting event broadcast feeds based on the volatility of a game situation, such as how close the score is, how much time is remaining in the game, whether the game is in overtime, and the like. For example, in a tied basketball game at 100-100 with 5 minutes left, each bucket subsequently shifts the probability to favor the team that just scored and took the lead. If the lead changes happen often, the shifts are sudden, and only one outcome can be favorable ultimately.

Additionally, the gaming engine can generate proposed betting scenarios based on the different sporting event feeds, including both sporting events that are currently displayed on the video stream 210 and those sporting events not being currently displayed. For example, in a fantasy basketball tournament, there may be several simultaneous games being played on different networks such as MSG, ESPN, and NBATV, or RSNs. VASSET would enable for seamless switching between the live sporting event feeds synced to the gaming engine. This can be customized for the individual user's wagers or can be the same switching scheme for all of the player's in a tournament.

Figure 5:
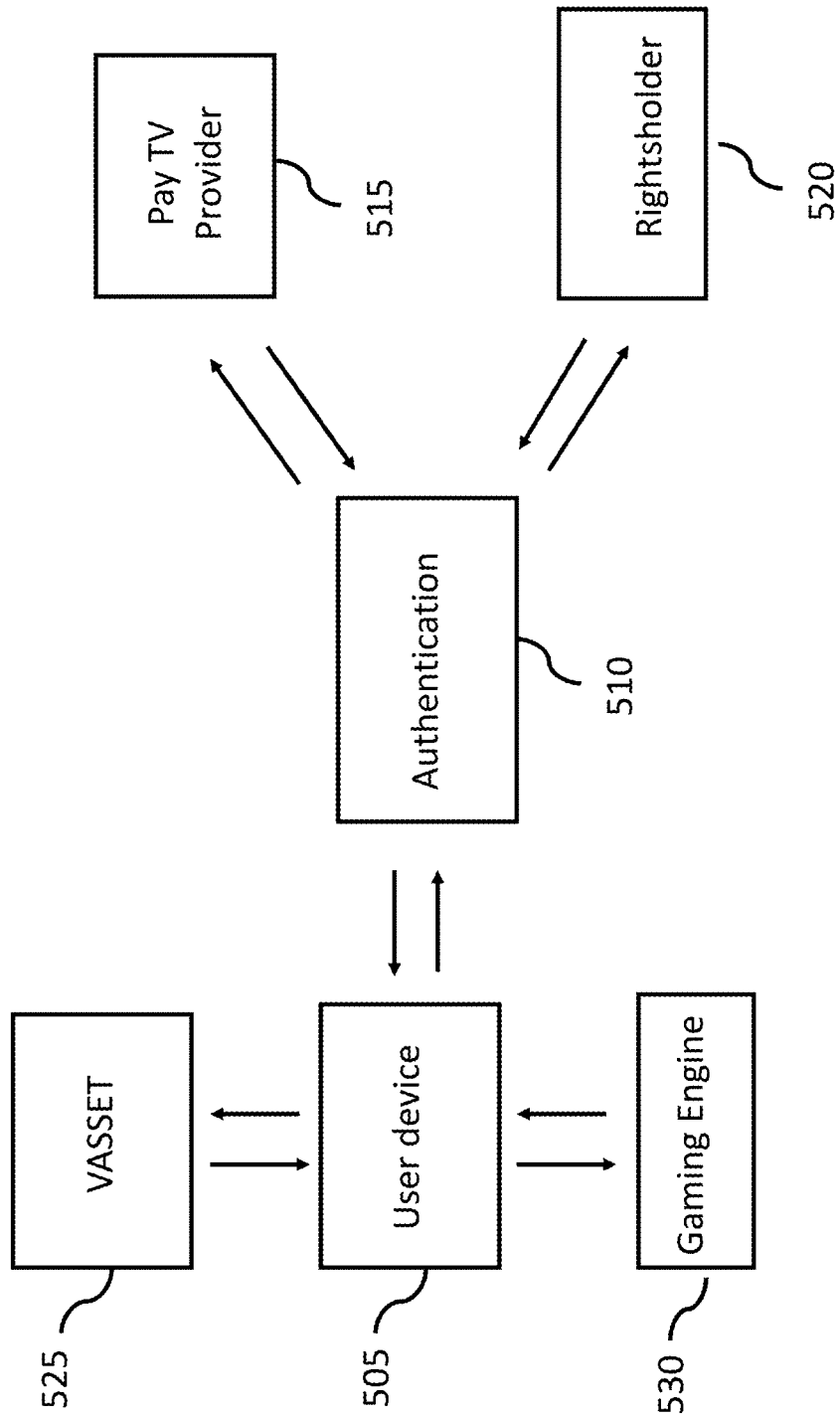
FIG. 5 is a flowchart showing a method for compensating a Pay TV provider or a rightsholder using VASSET according to another embodiment of the present disclosure.

FIG. 5 is a flowchart showing a method for compensating a Pay TV provider or a rightsholder using VASSET according to another embodiment of the present disclosure.

Referring to FIG. 5, the user can request to view different video streams of different sporting events on his computing device 505. In response to the request, the user may be asked to authenticate his Pay TV subscription in 510. In some embodiments, the user can authenticate his Pay TV subscription by entering a username or password (e.g., authentication information) that was provided by the user's Pay TV subscription provider. The user's authentication information can be verified by sharing the information with the corresponding Pay TV provider 515 or the corresponding rightsholder 520. If the Pay TV provider 515 or the rightsholder 520 verify the user's authentication information, the Pay TV provider 515 or the rightsholder 520 can authorize the user to view different video streams of different sporting events. In some embodiments, the live video stream can switch between the different live video streams of different sporting events via VASSET 525. Additionally, the gaming engine 530 can generate betting scenarios based on the live video stream of the sporting event currently displayed on the user's device.

According to various embodiments, VASCER and VASSET can work together to improve the gaming experience of users. In one embodiment, VASCER can be converged with a gaming engine, whereby partial broadcasts and streams can be compiled in real-time in accordance with a real-time proposition game. For instance, a gaming engine could produce a game of the first at-bat of the lead-off hitter in a series of 5 baseball games scheduled to start within minutes of each other. The gaming engine would then sequentially cycle through the five batters by generating and producing betting scenarios as each lead-off hitter comes up to bat, while simultaneously the VASSET switching technology would be deployed to display the televised stream of each of the five at-bats sequenced to the timing of each batter. VASCER can then compensate the pay TV distributor, league, team, TV network, or other rightsholder in an automated way based on the compensation parameters provided by the rightsholders.

Figure 6:
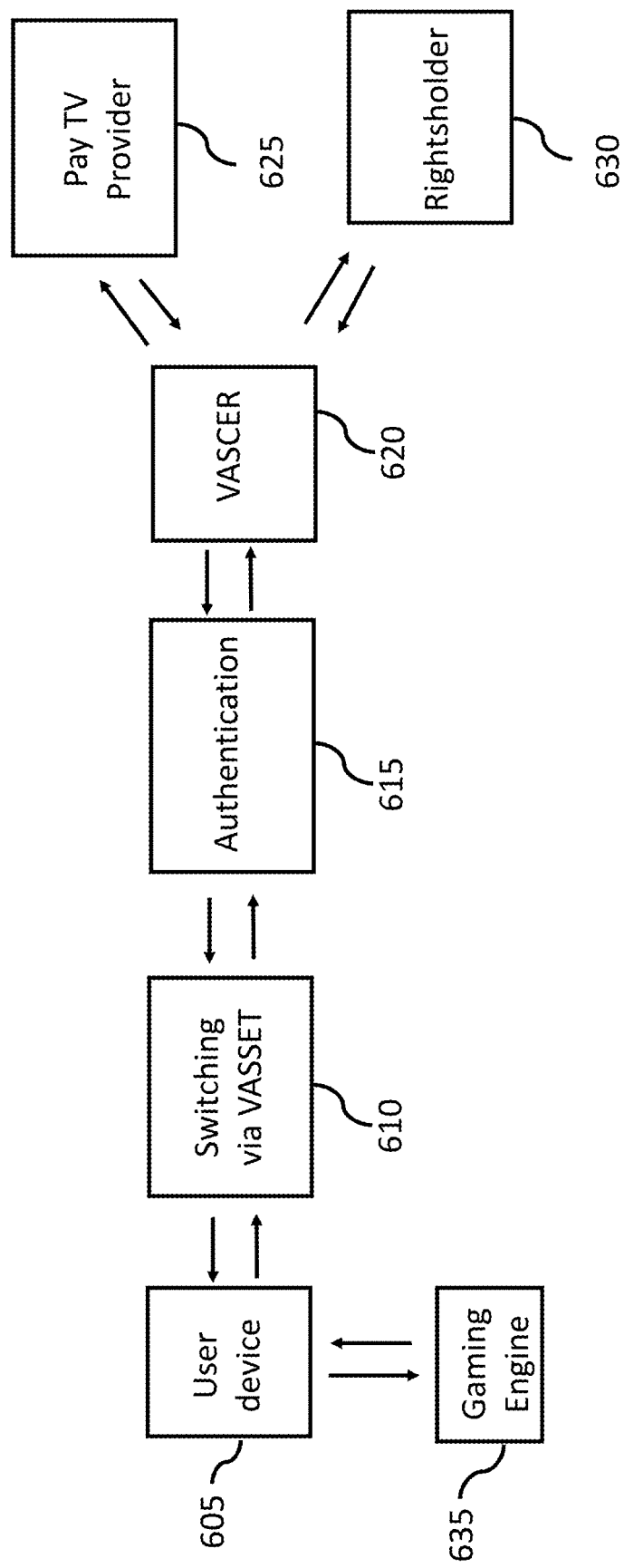
FIG. 6 is a flowchart showing a method for compensating a Pay TV provider or a rightsholder using VASCER and VASSET according to an embodiment of the present disclosure.

FIG. 6 is a flowchart showing a method for compensating a Pay TV provider or a rightsholder using VASCER and VASSET according to an embodiment of the present disclosure.

Referring to FIG. 6, the user may not have a Pay TV subscription (e.g., unauthenticated user). In some embodiments, the unauthenticated user may still request to view different video streams of different sporting events on his computing device 605. VASSET 615 can allow the unauthenticated user to switch between the different video streams using VASCER 620. Under VASCER 620, a compensation mechanism can be setup with the Pay TV provider 625 and the Rightsholder 630. The compensation mechanism can allow the unauthenticated user to watch the live broadcast feed of the sporting event. In some embodiments, the Pay TV Provider 625 and the Rightsholder 630 can be compensated on a fee structure such as dollars per second or dollars per minute, or only allow viewing for a set time period (e.g., one hour). In other embodiments, the Pay TV Provider 625 and the Rightsholder 630 can be compensated by a percentage of the dollar amount wagered by the unauthenticated user or entry fee paid by the unauthenticated user. Additionally, the gaming engine 635 can generate betting scenarios based on the live video stream of the sporting event currently displayed on the unauthenticated user's device.

In some embodiments, VASCER can adjust the compensation mechanism based on the volatility of a proposed betting scenario. For example, the gaming engine could generate a volatile betting scenario for Aaron Rodgers to throw for 50 yards on this possession, with the Green Bay Packers behind by 4 points with 3 minutes left. VASCER could specify that a stream for this game can be shown for 25 cents per minute to any user within the application device. Since VASCER can determine that a particular game is in the most dramatic period (e.g., most volatile period), in some embodiments VASCER may elect to request premium pricing for the final minutes dynamically.

Figure 7:
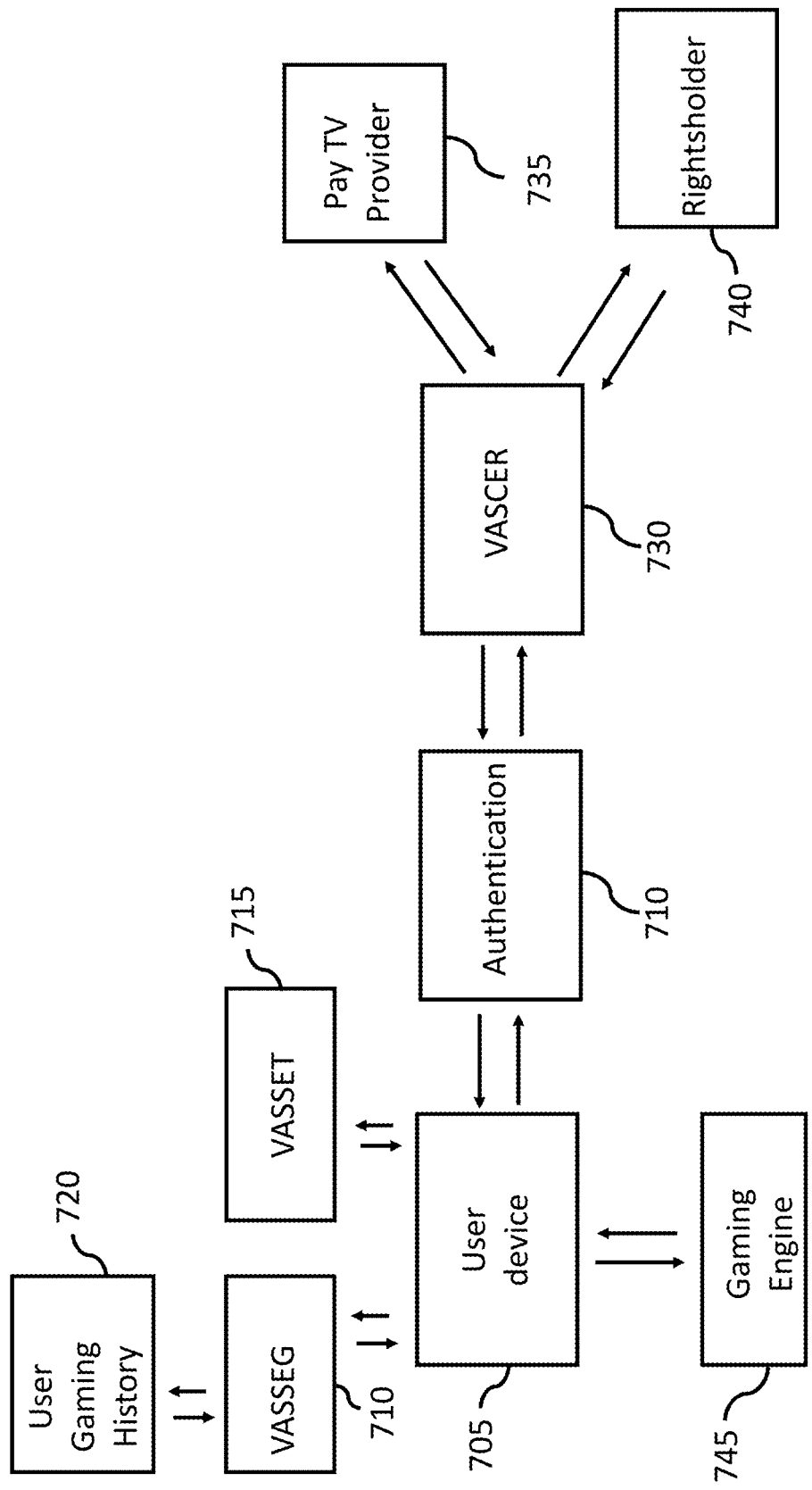
FIG. 7 is a flowchart showing a method for compensating a Pay TV provider or a rightsholder using VASSEG, VASSET, and VASCER according to an embodiment of the present disclosure.

FIG. 7 is a flowchart showing a method for compensating a Pay TV provider or a rightsholder using VASSEG, VASSET, and VASCER according to an embodiment of the present disclosure.

Referring to FIG. 7, the user can request to view different video streams of different sporting events on his computing device 705. In response to the request, the user may be asked to authenticate his Pay TV subscription in 710. In some embodiments, the user can authenticate his Pay TV subscription by entering a username or password (e.g., authentication information) that was provided by the user's Pay TV subscription provider. The user's authentication information can be verified through VASCER 715 sharing the authentication information with the corresponding Pay TV provider 735 or the corresponding rightsholder 740. If the Pay TV provider 735 or the rightsholder 740 verify the user's authentication information, the Pay TV provider 735 or the rightsholder 740 can authorize the user to view different video streams of different sporting events. In some embodiments, the live video stream can switch between the different live video streams of different sporting events via VASSET 725. Additionally, the gaming engine 730 can generate betting scenarios based on the live video stream of the sporting event currently displayed on the user's device.

According to FIG. 7, VASSEG 710 can collect user gaming history 720 (e.g., user's gaming activity, including gaming tournament entry fees paid by the user, wagers placed by the user, and amount of real money deposits made by the user). VASSEG 710 can offer free or discounted streams of the different sporting events based on the user gaming history 720. The offer for free or discounted streams for the user can be shared with VASCER 730 via the user device 705 and authentication 710. Under VASCER 730, a compensation mechanism can be setup with the Pay TV provider 625 and the Rightsholder 630 to compensate the Pay TV provider 735 and rightsholder 740 for the free or discounted streams. In some embodiments, the Pay TV Provider 735 and the Rightsholder 740 can be compensated on a fee structure such as dollars per second or dollars per minute, or only allow viewing for a set time period (e.g., one hour). In other embodiments, the Pay TV Provider 735 and the Rightsholder 740 can be compensated by a percentage of the dollar amount wagered by the unauthenticated user or entry fee paid by the unauthenticated user.

Figure 8:
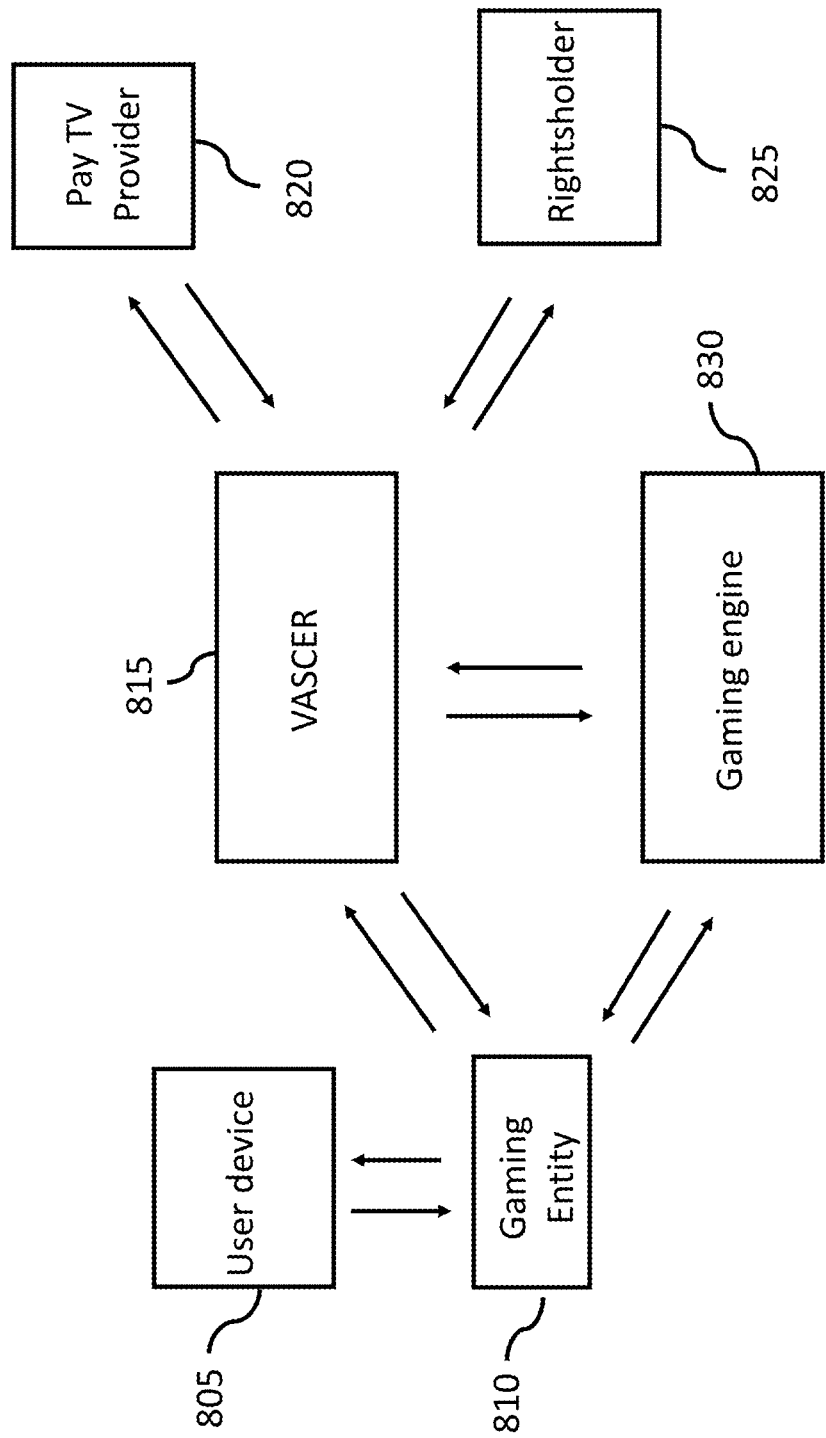
FIG. 8 is a flowchart showing a method for compensating a Pay TV provider or a rightsholder by a gaming entity using VASCER according to an embodiment of the present disclosure.

FIG. 8 is a flowchart showing a method for compensating a Pay TV provider or a rightsholder by a gaming entity using VASCER according to an embodiment of the present disclosure.

Referring to FIG. 8, a user may be using a sports gaming device application on his user device 805. The sports gaming device application may be operated by a gaming entity 810. The user may not have a Pay TV subscription (e.g., unauthenticated user), but may still request to view a live video stream of a sporting event on his computing device 805. The gaming entity 810 can allow the unauthenticated user to view the live video stream using VASCER 815. Under VASCER 815, a compensation mechanism can be setup with the Pay TV provider 820 and the Rightsholder 825. The compensation mechanism can allow the unauthenticated user to watch the live video stream of the sporting event. In some embodiments, the Pay TV Provider 820 and the Rightsholder 825 can be compensated on a fee structure such as dollars per second or dollars per minute, or only allow viewing for a set time period (e.g., one hour). In other embodiments, the Pay TV Provider 820 and the Rightsholder 825 can be compensated by a percentage of the dollar amount wagered by the unauthenticated user or entry fee paid by the unauthenticated user. Additionally, the gaming engine 830 can generate betting scenarios based on the live video stream of the sporting event. The gaming engine 815 can send the generated betting scenarios to the gaming entity 810. The gaming entity 810 can then send the betting scenarios to the user device 805.

Figure 9:
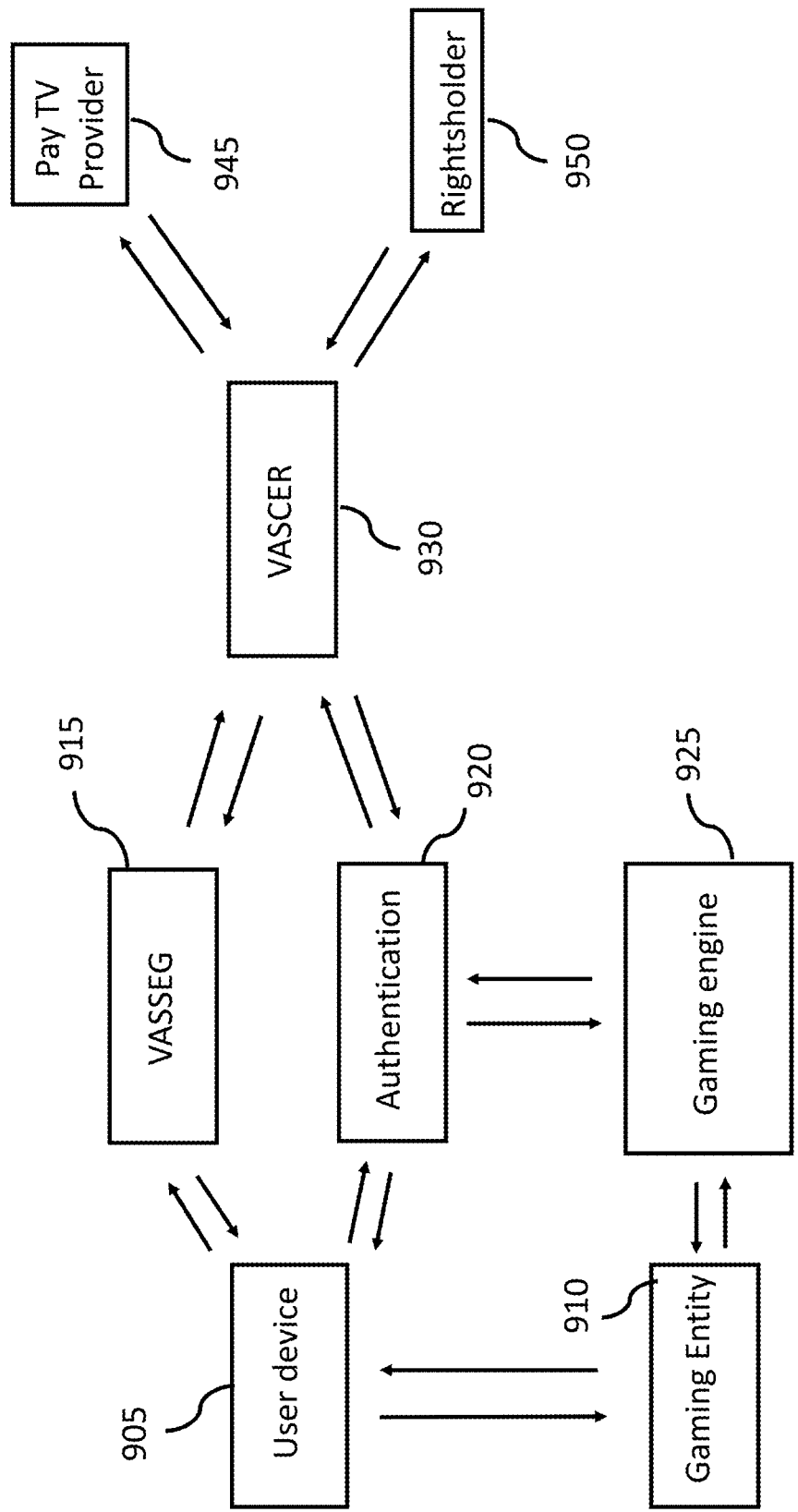
FIG. 9 is a flowchart showing a method for compensating a Pay TV provider or a rightsholder using VASSEG, VASCER, and a gaming entity according to an embodiment of the present disclosure.

FIG. 9 is a flowchart showing a method for compensating a Pay TV provider or a rightsholder using VASSEG, VASCER, and a gaming entity according to an embodiment of the present disclosure.

Referring to FIG. 9, the user can request to view a live video stream of a sporting event on his computing device 905. In response to the request, the user may be asked to authenticate his Pay TV subscription in 910. In some embodiments, the user can authenticate his Pay TV subscription by entering a username or password (e.g., authentication information) that was provided by the user's Pay TV subscription provider. The user's authentication information can be verified through VASCER 930 sharing the authentication information with the corresponding Pay TV provider 945 or the corresponding rightsholder 950. If the Pay TV provider 945 or the rightsholder 950 verify the user's authentication information, the Pay TV provider 945 or the rightsholder 940 can authorize the user to view the live video stream of the sporting event. Additionally, the gaming engine 925 can generate betting scenarios based on the live video stream of the sporting event. The gaming engine 925 can send the generated betting scenarios to the gaming entity 910. The gaming entity 910 can then send the betting scenarios to the user device 905.

According to FIG. 9, VASSEG 915 can collect user gaming history (e.g., user's gaming activity, including gaming tournament entry fees paid by the user, wagers placed by the user, and amount of real money deposits made by the user) from the user device 905. VASSEG 915 can offer free or discounted streams of the different sporting events based on the user gaming history. VASSEG 915 can share the offer for free or discounted streams for the user with VASCER 930. Under VASCER 930, a compensation mechanism can be setup with the Pay TV provider 945 and the Rightsholder 950 to compensate the Pay TV provider 945 and rightsholder 950 for the free or discounted streams. In some embodiments, the Pay TV Provider 945 and the Rightsholder 950 can be compensated on a fee structure such as dollars per second or dollars per minute, or only allow viewing for a set time period (e.g., one hour). In other embodiments, the Pay TV Provider 945 and the Rightsholder 950 can be compensated by a percentage of the dollar amount wagered by the unauthenticated user or entry fee paid by the unauthenticated user.

It will be understood that when an element is referred to as being "on," "connected to," or "coupled to" another element, it may be connected, or coupled to the other element or one or more intervening elements may also be present. When an element is referred to as being "directly connected to," or "directly coupled to" another element, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use,"

"using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a) and 35 U.S.C. § 132(a).

The term "processing circuit" is used herein to mean any combination of hardware, firmware, and software, employed to process data or digital signals. Processing circuit hardware may include, for example, radio baseband processors (BPs or BBPs), application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Various computational portions of embodiments of the present invention, including the operation of a sports gaming event through a device application, may be implemented through purpose-specific computer instructions executed by a computer system. The computer system may include one or more processors, including one or more central processing units (CPUs), one or more graphics processing units (GPUs), one or more field programmable gate arrays (FPGAs), one or more digital signal processors (DSPs), and/or one or more application specific integrated circuits (ASICs). The computer system may also include peripherals such as communications devices (e.g., network adapters, serial or parallel data bus adapters, graphics adapters) for transmitting and/or receiving data to and from other devices such as data storage systems (e.g., databases), display devices, and other computer systems. The computations may be distributed across multiple separate computer systems, some of which may be local to the users (e.g., user devices such as smartphones and personal computers) and some of which may be remote (e.g., off-site, "cloud" based computing resources connected to the user devices through a wide area network such as the Internet).

Although example embodiments of integrating authenticated pay television streams in the context of internet-based sports gaming device application system have been described and illustrated herein, many modifications and variations within those embodiments will be apparent to those skilled in the art. Accordingly, it is to be understood that the integrating authenticated pay television streams in the context of internet-based sports gaming device application according to the present invention may be embodied in forms other than as described herein without departing from the spirit and scope of the present invention. The present invention is defined by the following claims and equivalents thereof.

What is claimed is:

1. A system for integrating authentication of pay television streams for a sports gaming event using a graphical interface of a computing device application, the system comprising:
   a processor; and
   a memory coupled to the processor, wherein the memory stores instructions that, when executed by the processor, cause the processor to:

receive a request to display a live video stream of a sporting event from a user;

receive media service provider authentication information from the user;

share the media service provider authentication information with a media service provider to verify that the user is a subscriber of the media service provider;

display the live video stream on the graphical interface of the computing device application in response to the verification of the media service provider authentication information;

receive sports data about the sporting event via a network;

access a database of historical statistics relating to the sporting event and to players playing in the sporting event;

select at least one betting scenario from a betting scenario database based on the sports data and the historical statistics;

display the at least one betting scenario on the graphical interface; and receive a response to the at least one betting scenario from the user.

2. The system according to claim 1, wherein the sports data is received from a third party vendor via the network.

3. The system according to claim 1, wherein the authentication information comprises a username and a password of the user.

4. The system according to claim 1, wherein the media service provider comprises at least one of: a Pay TV provider, a TV network, a professional sports league, a professional sports team, or a rightsholder.

5. The system according to claim 1, wherein the instructions further cause the processor to receive the live video stream of the sporting event from the media service provider.

6. The system according to claim 1, wherein the instructions further cause the processor to:

invite an additional user to view the live video stream;

receive additional media service provider authentication information from the additional user;

verify the additional media service provider authentication information with the media service provider; and display the live video stream on an additional interface of an additional computing device application of the additional user in response to the verification of the additional media service provider authentication information.

7. The system according to claim 1, wherein the instructions further cause the processor to display a second video stream of a second sporting event on the graphical interface of the computing device application, wherein the second video stream is selected from a plurality of video streams of a plurality of sporting events.

8. The system according to claim 7, wherein the second video stream is selected by the user.

9. The system according to claim 7, wherein the instructions further cause the processor to:

receive sports data about the plurality of sporting events;

select the second video stream of the second sporting event based on sports data about the second sporting event; and display the second video stream on the graphical interface of the computing device application.

10. A system for integrating authentication of pay television streams for a sports gaming event using a graphical interface of a computing device application, the system comprising:

a processor; and a memory coupled to the processor, wherein the memory stores instructions that, when executed by the processor, cause the processor to:

request media service provider authentication from the user to display a live video stream of a sporting event from a media service provider;

share the media service provider authentication from the user with the media service provider to verify that the user is a subscriber of the media service provider;

display the live video stream of the sporting event on the graphical interface of the computing device application in response to receiving the media service provider authentication from the media service provider based on a fee structure with the media service provider;

receive sports data about the sporting event via a network;

access a database of historical statistics relating to the sporting event and to players playing in the sporting event;

select at least one betting scenario from a betting scenario database based on the sports data and the historical statistics;

display the at least one betting scenario on the graphical interface;

receive a response to the at least one betting scenario from a user; and send a payment to the media service provider based on the media service provider authentication and according to the fee structure.

11. The system according to claim 10, wherein the fee structure comprises an amount of currency over a period of time.

12. The system according to claim 10, wherein the fee structure comprises a percentage of an amount of currency wagered by the user.

13. The system according to claim 10, wherein the fee structure comprises a percentage of an entry fee paid by the user.

14. The system according to claim 10, wherein the sports data is received from a third party vendor via the network.

15. The system according to claim 10, wherein the media service provider comprises at least one of: a Pay TV provider, a TV network, a professional sports league, a professional sports team, or a rightsholder.

16. The system according to claim 10, wherein the instructions further cause the processor to display a second video stream of a second sporting event on the graphical interface of the computing device application, wherein the second video stream is selected from a plurality of video streams of a plurality of sporting events.

17. The system according to claim 16, wherein the second video stream is selected by the user.

18. The system according to claim 16, wherein the instructions further cause the processor to:

receive sports data about the plurality of sporting events;

select the second video stream of the second sporting event based on sports data about the second sporting event; and display the second video stream on the graphical interface of the computing device application.

19. A method for integrating authentication of pay television streams for a sports gaming event using a graphical interface of a computing device application, the method comprising:

requesting, by a processor, media service provider authentication from a user to display a live video stream of a sporting event from a media service provider;

sharing, by the processor, the media service provider authentication from the user with the media service provider to verify that the user is a subscriber of the media service provider to display the live video stream of the sporting event based on a fee structure with the media service provider;

displaying, by the processor, the live video stream of the sporting event on the graphical interface of the computing device application in response to receiving the media service provider authentication from the media service provider based on a fee structure with the media service provider;

receiving, by the processor, sports data about the sporting event via a network;

accessing, by the processor, a database of historical statistics relating to the sporting event and to players playing in the sporting event;

selecting, by the processor, at least one betting scenario from a betting scenario database based on the sports data and the historical statistics;

displaying, by the processor, the betting scenario on the graphical interface; and receiving, by the processor, a response to the betting scenario from a user.

20. The method according to claim 19, the method further comprising sending, by the processor, a payment to the media service provider according to the fee structure.

21. The method according to claim 19, wherein the fee structure comprises an amount of currency over a period of time.

22. The method according to claim 19, wherein the fee structure comprises a percentage of an amount of currency wagered by the user.

23. The method according to claim 19, wherein the fee structure comprises a percentage of an entry fee paid by the user.

* * * * *